Feb. 4, 1958 C. M. JOHNSON 2,822,199
CABLE TIGHTENER
Filed Dec. 10, 1953
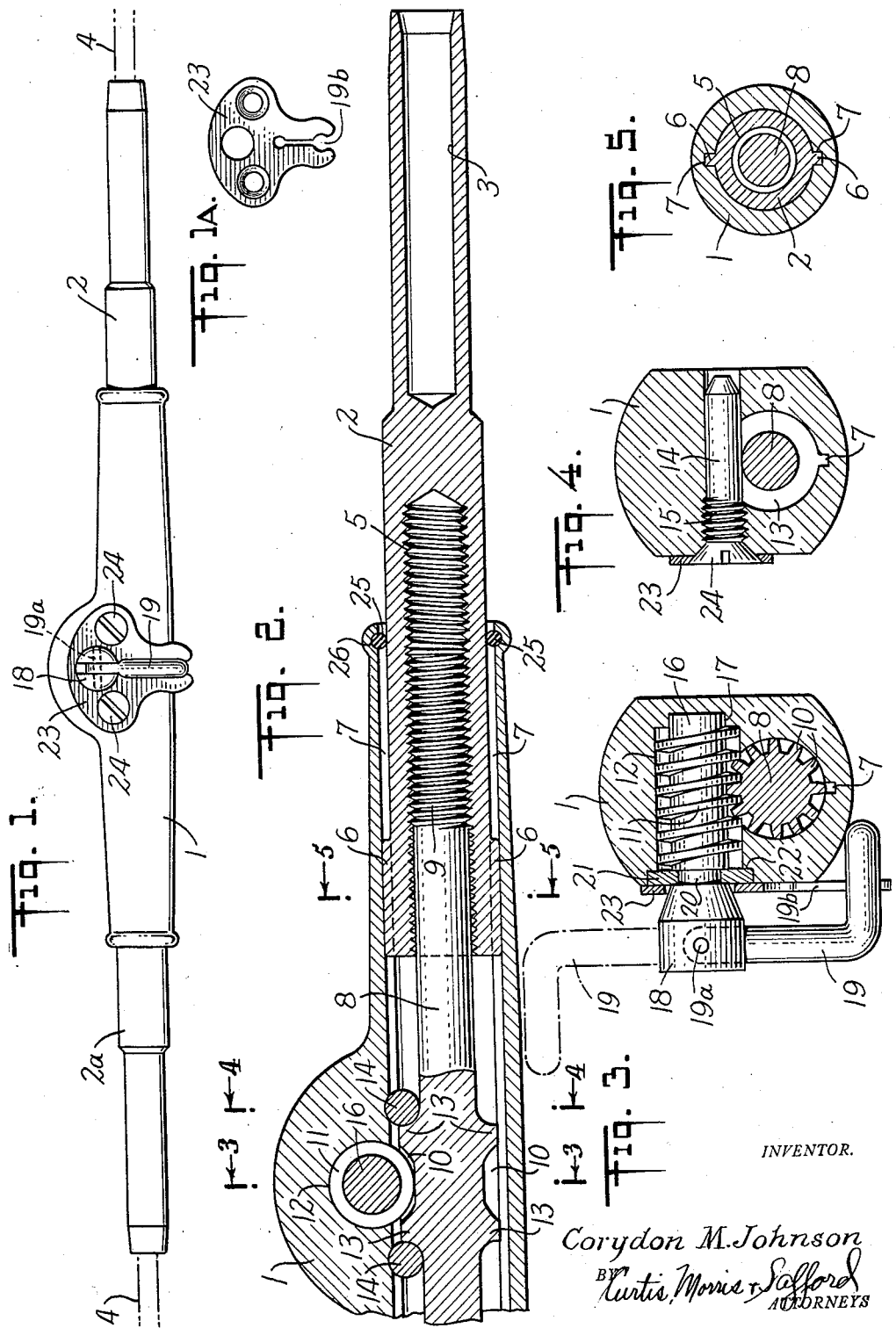
INVENTOR.
Corydon M. Johnson
BY Curtis, Morris & Safford
ATTORNEYS

United States Patent Office 2,822,199
Patented Feb. 4, 1958

2,822,199
CABLE TIGHTENER

Corydon M. Johnson, Freeport, N. Y., assignor to Johnson Research Corporation, Bethpage, N. Y.

Application December 10, 1953, Serial No. 397,420

5 Claims. (Cl. 287—60)

The present invention relates to an improvement in cable tighteners. An object thereof has been to provide a tightener which, in addition to its sturdy and durable features, is so constructed that interengaging surfaces of movable parts thereof are effectively enclosed, that the lubricant supply thereon is protected against deterioration and loss by sealing means; that no tools are required to operate or adjust said parts; and that loosening of the tightener due to relaxing or reversal of its tensioning parts is prevented. Further objects of and advantages associated with use of the invention will appear from disclosures of the specification as hereinafter developed.

A cable tightener embodying the present invention includes cable engaging end pieces or draw rods mounted to slide longitudinally in a housing, a screw provided at one end with a left hand pitch thread and at the other end with a right hand pitch thread, said screw being rotatably mounted in said housing coaxially with and between said end pieces and with said threads engaging correspondingly threaded recesses in said respective end pieces to move them simultaneously in opposite directions longitudinally in the housing when the screw is rotated, gear means on said screw, a worm gear engaging said gear means within said housing and having an actuating portion accessible outside the housing arranged and adapted to be rotated and thus to turn said screw in one direction to move said end pieces inwardly for tensioning and in the opposite direction to move said end pieces outwardly for releasing tension.

One embodiment of my invention is described in the following specification and illustrated in the drawings appended hereto and in which:

Figure 1 is a side elevation;

Figure 1A, a view in elevation of the locking plate shown in Figure 1;

Figure 2, a fragmentary view in central longitudinal section on enlarged scale;

Figure 3, a transverse section on line 3—3 of Figure 2;

Figure 4, a transverse section on line 4—4 of Figure 2; and

Figure 5, a transverse section on line 5—5 of Figure 2.

The embodiment of my invention, as shown in the drawings, comprises in general a housing in which cable-engaging draw rods are mounted to slide longitudinally when actuated by a screw located in the housing and which is in turn operated by a worm gear also in the housing but accessible from the outside thereof. More specifically, the cable tightener shown in Figure 1 includes a housing 1 having a tubular bore extending longitudinally between end openings. Draw rods 2 and 2a mounted in said housing each includes an outer portion having suitable cable gripping means here shown as a socket or recess 3, Figure 2, adapted to receive and retain an end of a cable 4, or the like, and an inner end portion slidably engaging the bore of the housing and having a threaded recess 5 opening into the interior thereof. Said inner end portion of the draw rod 2 is provided with splines 6 which engage and slide in longitudinal slots 7 in housing 1 and prevent the draw rod from rotating therein.

Said draw rods 2 and 2a are drawn inwardly for tensioning cable 4 by a screw 8 mounted in said housing coaxially with the bore thereof and with said draw rods 2. One end of screw 8 is provided with a right-hand thread, as 9, and the other with a left-hand thread, each of said screw threads being engaged with one of said threaded recesses 5. Thus, when screw 8 is turned in one direction, draw rods 2 are pulled inwardly to tension cable 4; and when screw 8 is turned in the opposite direction, said draw rods 2 are moved outwardly to reduce tension on said cable 4.

Means are provided for moving said draw rods 2 endwise in housing 1 without rotation of the housing or of the draw rods and by applying screw-turning forces to parts accessible outside of the housing. Thus in the illustrated embodiment, screw 8 is rotated within housing 1 by suitable gearing including a pinion 10 coaxial with and in driving relation to screw 8 and a worm gear 11 housed in a transversely disposed recess 12 which opens into said bore and in driving relation to said pinion 10. As seen in Figure 2, the teeth of pinion 10 are located between peripheral bearing flanges 13 extending outwardly from intermediate or shank portions of the screw 8 and opposite the opening of recess 12 into the bore of the housing.

The outer lateral face of each flange 13 is curved, or otherwise suitably shaped, to be effectively engaged by portions of stop pins 14 and thus to prevent longitudinal displacement of screw 8 while permitting its rotation in the bore of said housing. Other portions of the shanks of said pins 14 are threaded at 15, Figure 4, to engage and hold said pins in transversely disposed holes in the housing wall which open into said bores at either side of recess 12. Thus pins 14 extend transversely across the bore and are in position to bear against the outer lateral faces of flanges 13.

The helical turns of worm gear 11 which engage the teeth of pinion 10 on screw 8, Figure 3, are carried on a central shank 16, the inner end of which fits into a recess 17 in the wall of housing 1. The outer end of shank 16 has a head 18 which carries a crank 19 pivoted at 19a; and a neck 20 of reduced cross section connects head 18 with shank 16 and provides a peripheral groove which is occupied by inner portions of rings 21. Said crank 19 swings on pivot 19a between its upper or operating position, shown in dotted lines, Figure 3, and its lower or locking position, shown in full lines. The free end of said crank when in lower position is arranged to engage a slot 19b in a locking plate 23, Figure 1A. Outer peripheral portions of said rings 21 rest on an annular shoulder 22 which extends around the outer edge of recess 12. Locking plate 23 also encircles a portion of head 18 and is secured in operative position by the heads 24 of stop pins 14, the arrangement being such that flat portions of locking plate 23 overlie peripheral edge portions of the ring 21, thereby serving to hold said rings and the worm gear in operative assembled relation and to cover the joint between said rings and the housing wall. The plate securing function of stop pins 14 is in addition to their screw position retaining function previously described.

It is contemplated that the cavity or bore of housing 1 will be supplied with a charge of suitable lubricant which will be available not only to the sliding or bearing surfaces of the bore, but also to the threaded portions of the screw and the draw bolts and to the worm gear and cooperating parts.

Undue loss and deterioration of the lubricant are in part prevented by seal rings or wipe seals 25, Figure 2, interposed between the draw rods 2 and annular groves 26 in the bore of housing 1.

With the parts assembled in the relation above described, the interengaging or working surfaces are effectively enclosed and protected against weather and other conditions which commonly impair the usefulness of devices employed for similar purposes.

It will be apparent from the foregoing that, when the above described tightening device is arranged between end portions of a cable and with said end portions securely gripped by the draw rods, said cable will be tightened or brought under increasing tension by swinging crank 19 outwardly and upwardly to the dotted line position shown in Figure 3 and turning said crank in such direction that the draw rods will be pulled inwardly. Crank 19 is then returned to full line position, as shown in said Figure 3, where it is locked against angular displacement by engagement with slot 19b in lock plate 19c. The worm gear 11 serves also as a lock to prevent any accidental or vibration-produced reverse turning of screw 8. To loosen or relax tension on cable 4, worm gear 11 is turned in the opposite direction. It is noted that tightening and loosening operations require no rotation of the housing or of the draw bolts which are splined thereto; nor does such turning take place as an incident of manipulation. Thus, any applied tension-adjusting force is brought to bear with optimum effect.

I claim:

1. A cable tightener of the character described comprising: an elongated, unitary hollow tubular housing having a generally cylindrical longitudinal bore, a high tensile strength rod-like member completely enclosed within said housing and being rotatably mounted centrally within said bore and having its two ends axially threaded, the right end having a right hand thread and the left end having a left hand thread, the center part of said member carrying a worm wheel, a right hand shaft mounted for axially sliding within one end of said bore and being axially threaded and engaged with the right hand end of said rod-like member, a left hand shaft mounted for axially sliding within the other end of said bore and being axially threaded and engaged with the left hand end of said rod-like member, means to positively prevent the rotation of said shafts relative to said bore, a worm shaft transversely mounted within said housing and engaged with said worm wheel, one end of said shaft extending out from said housing, and a crank member mounted on the outer end of said worm shaft to permit rotation thereof, whereby by rotating said rod-like member in one direction said shafts can be extended outward from said bore and by rotating said rod-like member in the opposite direction, said shafts can be retracted into said bore without tending to rotate said housing and without allowing dirt to enter, said means for positively preventing rotation of said shafts including a longitudinal spline rib carried on each of said shafts and engaging in a mating longitudinal groove in each end of said bore, said rib being adapted to bear against the outer end of said bore to prevent complete withdrawal of said shafts.

2. A cable tightener of the character described comprising: an elongated, unitary hollow tubular housing having a generally cylindrical longitudinal bore, a high tensile strength rod-like member completely enclosed within said housing and being rotatably mounted centrally within said bore and having its two ends axially threaded, the right end having a right hand thread and the left end having a left hand thread, the center part of said member carrying a worm wheel, a right hand shaft mounted for axially sliding within one end of said bore and being axially threaded and engaged with the right hand end of said rod-like member, a left hand shaft mounted for axially sliding within the other end of said bore and being axially threaded and engaged with the left hand end of said rod-like member, means to positively prevent the rotation of said shafts relative to said bore, a worm shaft transversely mounted within said housing and engaged with said worm wheel, one end of said shaft extending out from said housing, and a crank member mounted on the outer end of said worm shaft to permit rotation thereof, whereby by rotating said rod-like member in one direction said shafts can be extended outward from said bore and by rotating said rod-like member in the opposite direction, said shafts can be retracted into said bore without tending to rotate said housing and without allowing dirt to enter, two transverse pins engaged on respective sides against said worm wheel whereby axial shifting of said rod-like member is positively prevented other than by said worm shaft.

3. A cable tightener of the character described comprising: an elongated, unitary hollow tubular housing having a generally cylindrical longitudinal bore, a high tensile strength rod-like member completely enclosed within said housing and being rotatably mounted centrally within said bore and having its two ends axially threaded, the right end having a right hand thread and the left end having a left hand thread, the center part of said member carrying a worm wheel, a right hand shaft mounted for axially sliding within one end of said bore and being axially threaded and engaged with the right hand end of said rod-like member, a left hand shaft mounted for axially sliding within the other end of said bore and being axially threaded and engaged with the left hand end of said rod-like member, means to positively prevent the rotation of said shafts relative to said bore, a worm shaft transversely mounted within said housing and engaged with said worm wheel, one end of said shaft extending out from said housing, and a crank member mounted on the outer end of said worm shaft to permit rotation thereof, whereby by rotating said rod-like member in one direction said shafts can be extended outward from said bore and by rotating said rod-like member in the opposite direction, said shafts can be retracted into said bore without tending to rotate said housing and without allowing dirt to enter, two sealing ring gaskets, each carried by said housing and positioned between the outer end of said bore and a respective one of said shafts, whereby lubricant can be sealed within said housing and dirt and dust will be excluded.

4. The structure as in claim 3 wherein the outer ends of said rod-like member are externally threaded, and the inner ends of said shafts are internally threaded being screwed upon the ends of said rod-like member, the central portion of each of said shafts being cylindrical and smooth to slide beneath said ring gaskets.

5. In a cable tightener, the combination of a housing which provides a longitudinally disposed bore having an opening in each end and which is otherwise closed, a left and a right draw rod each extending through a respective one of said openings and each having a bearing portion mounted to slide longitudinally in said bore, said left rod at its inner end having an axial left threaded recess co-axial with said bore, said right rod at its inner end having an axial right threaded recess co-axial with said bore, a draw rod actuating screw threaded at both ends and having one end left threaded and the other end right threaded and being rotatably mounted in said bore co-axially with said draw rods with its threaded ends extending into and engaging corresponding ones of the threaded recesses of said draw rods, spline key means carried by said housing and engaged with said rods for positively preventing their rotation, and gear means mounted in said housing and completely encased therein and including a toothed portion fast on said draw rod screw, and a mating portion fast on a movable member a part of which extends outside of said housing and another part of which engages said toothed portion, said movable member being adapted to selectively rotate said screw to move said draw rods within said bore simultaneously toward each other for tensioning or simultaneously away from each other for releasing said tension.

References Cited in the file of this patent

UNITED STATES PATENTS

| 1,672,488 | Hall | June 5, 1928 |
| 1,765,397 | Birkenmaier | June 24, 1930 |

FOREIGN PATENTS

| 779,032 | France | Jan. 5, 1935 |